United States Patent
Ikeshima et al.

(10) Patent No.: US 10,025,013 B2
(45) Date of Patent: Jul. 17, 2018

(54) OPTICAL DISPLAY DEVICE

(71) Applicant: NITTO DENKO CORPORATION, Ibaraki-shi, Osaka (JP)

(72) Inventors: Kentaro Ikeshima, Fukuyama (JP); Minoru Miyatake, Onomichi (JP); Yuki Nakano, Mihara (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 408 days.

(21) Appl. No.: 13/791,017

(22) Filed: Mar. 8, 2013

(65) Prior Publication Data
US 2013/0235306 A1    Sep. 12, 2013

(30) Foreign Application Priority Data
Mar. 9, 2012    (JP) .................................. 2012-053005

(51) Int. Cl.
*G02B 5/30* (2006.01)
*G02F 1/1335* (2006.01)
*B29C 55/02* (2006.01)

(52) U.S. Cl.
CPC ..... *G02B 5/3033* (2013.01); *G02F 1/133528* (2013.01); *B29C 55/026* (2013.01); *G02F 2001/133531* (2013.01)

(58) Field of Classification Search
None
See application file for complete search history.

(56) References Cited

U.S. PATENT DOCUMENTS

| 8,314,987 B2 | 11/2012 | Goto et al. |
| 8,320,042 B2 | 11/2012 | Goto et al. |
| 8,379,169 B2 | 2/2013 | Kitagawa et al. |

(Continued)

FOREIGN PATENT DOCUMENTS

| CN | 1534318 A | 10/2004 |
| CN | 101281258 A | 10/2008 |

(Continued)

OTHER PUBLICATIONS

Korean Office Action for application No. 10-2013-023864 dated Mar. 25, 2014, citing the above reference(s).

(Continued)

*Primary Examiner* — Dennis Y Kim
(74) *Attorney, Agent, or Firm* — Hauptman Ham, LLP

(57) ABSTRACT

An optical display device which includes a display panel, and at least one polarizing film including a polyvinyl alcohol-based resin layer disposed on a viewing side with respect to the display panel, and having an optical arrangement forming a cross-Nicol relationship with regard to polarized light entering the polarizing film from the side of the display panel. The polarizing film is produced to have a thickness of 10 μm or less, by a method comprising the steps of: forming a polyvinyl alcohol-based resin layer on a resin substrate; stretching the polyvinyl alcohol-based resin layer integrally with the resin substrate; and dyeing the polyvinyl alcohol-based resin layer using a dichroic material. The polarizing film is disposed in the optical display device in a state in which a surface of the polarizing film as a contact surface with the resin substrate during the production thereof is oriented toward a side opposite to the display panel.

12 Claims, 8 Drawing Sheets

(56) References Cited

U.S. PATENT DOCUMENTS

| | | |
|---|---|---|
| 8,405,800 B2 | 3/2013 | Ishitani et al. |
| 8,411,360 B2 | 4/2013 | Kitagawa et al. |
| 8,520,169 B2 | 8/2013 | Kitagawa et al. |
| 8,520,171 B2 | 8/2013 | Kitagawa et al. |
| 8,610,846 B2 | 12/2013 | Ishitani et al. |
| 8,771,454 B2 | 7/2014 | Goto |
| 8,852,374 B2 | 10/2014 | Goto |
| 2007/0091229 A1* | 4/2007 | Jang et al. ............... 349/96 |
| 2007/0177086 A1 | 8/2007 | Ishitani et al. |
| 2008/0150421 A1* | 6/2008 | Takata .................... 313/504 |
| 2009/0021671 A1* | 1/2009 | Fukagawa et al. ......... 349/96 |
| 2011/0315306 A1 | 12/2011 | Goto et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0327512 A1 | 12/2012 | Goto et al. |
| 2013/0027622 A1 | 1/2013 | Ishitani et al. |
| 2013/0100529 A1 | 4/2013 | Kitagawa et al. |
| 2013/0235306 A1* | 9/2013 | Ikeshima .......... G02F 1/133528 349/96 |

FOREIGN PATENT DOCUMENTS

| | | |
|---|---|---|
| CN | 102313923 A | 1/2012 |
| EP | 2426526 A1 | 3/2012 |
| EP | 2426528 A2 | 3/2012 |
| JP | 4279944 | 12/2000 |
| JP | 2001343521 | 12/2001 |
| JP | 2003043257 | 2/2003 |
| JP | 4751481 | 8/2011 |
| JP | 4751486 | 8/2011 |
| JP | 4815544 | 11/2011 |
| KR | 1020070079558 A | 8/2007 |

OTHER PUBLICATIONS

European Search Report for application No. 13158472.4-1562 dated Jun. 28, 2013, citing the above reference(s).
Japanese Office Action for 2012-053005 dated Oct. 7, 2013, citing the above reference(s).
Taiwanese Office Action for application No. 102108232 dated Dec. 12, 2014, citing the above reference(s).
Chinese Office Action for application No. 201310076438.3 dated May 29, 2015, citing the above reference(s).

* cited by examiner

OPTICAL DISPLAY DEVICE

CROSS REFERENCE TO RELATED APPLICATION

This application claims the priority of Japanese Patent Application No. 2012-053005, filed on Mar. 9, 2012 in the JPO (Japanese Property Office), which is incorporated herein by reference in its entirety.

TECHNICAL FIELD

The present invention relates to an optical display device using a polarizing film produced by forming a polyvinyl alcohol-based resin layer on a resin substrate, and stretching and dyeing the polyvinyl alcohol-based resin layer integrally with the resin substrate.

BACKGROUND ART

There has been proposed a technique of producing an extremely thin polarizing film by forming a polyvinyl alcohol-based resin (hereinafter referred to as "PVA-based resin") layer on a thermoplastic resin substrate, and stretching and dyeing the PVA-based resin layer formed on the resin substrate, integrally with the resin substrate.

For example, JP 4279944B (Patent Document 1) describes a method of producing a polarizing plate. This method comprises: forming a PVA-based resin layer on one of opposite surfaces of a thermoplastic resin film to have a thickness of 6 μm to 30 μm by a coating process; stretching them at a stretching ratio of 2 to 5 times to transform the PVA-based resin layer into a transparent coating element layer, thereby forming a two-layered composite film composed of the thermoplastic resin film and the transparent coating element layer; laminating an optical transparent resin film layer onto the side of the transparent coating element layer of the two-layered composite film through a bonding agent; peeling and removing the thermoplastic resin film; and dyeing and stabilizing the transparent coating element layer to form a polarizing element layer. The polarizing plate obtained by this method has a two-layer structure composed of the optical transparent resin film layer and the polarizing element layer. According to the description of the Patent Document 1, the polarizing element has a thickness of 2 to 4 μm.

JP 2001-343521A (Patent Document 2) and JP 2003-043257A (Patent Document 3) also describe a method of producing a polarizing plate. This method comprises: uniaxially stretching a laminate composed of a thermoplastic resin substrate and a PVA-based resin layer applied and formed on the substrate, at a given temperature, for example, at a temperature of 70° C. to 120° C., in the case where the substrate is made of a non-crystallizable polyester resin; and dyeing the PVA type resin layer molecularly oriented by the stretching, to cause a dichroic material to be absorbed in the PVA type resin layer (i.e., cause the PVA type resin layer to be impregnated with a dichroic material). The Patent Document 2 includes a description that the uniaxial stretching may be either one of longitudinal uniaxial stretching and transverse uniaxial stretching. On the other hand, the method described in the Patent Document 3 is configured to subject the laminate to transverse uniaxial stretching, and, during or after the transverse uniaxial stretching, cause the laminate to shrink in length in a direction perpendicular to the stretching direction by a specific value. In both of the Patent Documents 2 and 3, a thickness of an obtainable polarizing film is described as being in the range of 1 to 1.6 μm.

JP 4751486B (Patent Document 4) describes a method of producing a polarizing film made of a PVA-based resin having a molecularly-oriented dichroic material and formed on a resin substrate to have a thickness of 7 μm or less. This method comprises: forming a PVA-based resin layer on a resin substrate; dyeing the PVA-based resin layer to cause a dichroic material to be absorbed in the PVA-based resin layer; stretching the PVA-based resin layer having the dichroic material absorbed therein, in a boric acid aqueous solution, integrally with the resin substrate, so as to allow a total stretching ratio to become 5 times or more an original length thereof. The method described in the Patent Document 4 makes it possible to produce a thin polarizing film having excellent optical characteristics.

JP 4751481B (Patent Document 5) describes a method of producing a continuous web of a polarizing film comprising a PVA-based resin having a molecularly-oriented dichroic material. This method comprises subjecting a laminate which comprises a non-crystallizable ester-based thermoplastic resin substrate and a PVA-based resin layer formed on the substrate, to a 2-stage stretching process consisting of preliminary in-air stretching and in-boric-acid-solution stretching. The method described in the Patent Document 5 makes it possible to obtain a polarizing film having a thickness of 10 μm or less and exhibiting high-level optical characteristics satisfying the following conditions: T≥42.3 and P≥99.9, where T is a single transmittance, and P is a polarization rate.

As above, in recent years, there have been proposed a large number of techniques for producing a polarizing film having a small thickness and exhibiting high-level polarizing characteristics, by forming a PVA-based resin layer on a thermoplastic resin substrate, and stretching and dyeing the PVA-based resin layer integrally with the substrate.

The polarizing film produced in the above manner is usable as a component or material for an optical display device, without any change, i.e., directly together with the thermoplastic resin substrate, or after attaching an optical film, such as a polarizer protection film or a phase difference film, to one surface of the polarizing film on a side opposite to the other surface as a contact surface with the thermoplastic resin substrate during production thereof, to thereby provide various functions thereto, and optionally peeling the thermoplastic resin substrate.

LIST OF PRIOR ART DOCUMENTS

Patent Documents

Patent Document 1: JP 4279944B
Patent Document 2: JP 2001-343521A
Patent Document 3: JP 2003-043257A
Patent Document 4: JP 4751486B
Patent Document 5: JP 4751481B

SUMMARY OF THE INVENTION

Technical Problem

As is obvious from the above description, such a type of polarizing film is produced under the condition that a PVA-based resin layer is formed on a thermoplastic resin film substrate, so that a state of a surface of the polarizing film as a contact surface with the thermoplastic resin film substrate during production thereof is greatly influenced by a state of a counterpart surface of the thermoplastic resin film substrate. For example, if a foreign substance such as an impurity is contained in a thermoplastic resin for the substrate, the foreign substance is likely to cause an irregularity or flaw in the surface of the thermoplastic resin substrate. Further, due to a problem in a production process of the thermoplastic resin substrate, an irregularity or flaw is likely to occur in the surface of the thermoplastic resin substrate. Moreover, during the course of forming the PVA-based resin layer on the thermoplastic resin film substrate, dust is likely to adhere onto the thermoplastic resin film substrate.

If a polarizing film is produced by forming a PVA-based resin layer on such a thermoplastic resin film substrate having an irregularity or flaw, or dust adhering thereon, and stretching and dyeing the PVA-based resin layer integrally with the substrate, an irregularity, flaw or the like is likely to be undesirably formed in a surface of the polarizing film as a contact surface with the thermoplastic resin substrate during the production thereof, in conformity to the irregularity or the like of the thermoplastic resin film substrate. Further, in the case where an optical film is attached to one surface of the polarizing film on a side opposite to the other surface as a contact surface with the thermoplastic resin substrate during the production thereof, a pressure is applied to the optical film and the thermoplastic resin substrate through a nip between rolls. As a result, an irregularity or the like is likely to be undesirably formed in the polarizing film due to the irregularity or the like of the thermoplastic resin film substrate.

If a polarizing film formed with an irregularity or flaw is used as a component or material for an optical display device, the irregularity or flaw is likely to lead to a defect such as a bright point which causes deterioration in visibility of the optical display device. Such a defect can be inspected, for example, by a cross-Nicol method. In the cross-Nicol method, first of all, two polarizing films are arranged in opposed relation to each other to allow their absorption axes to become orthogonal to each other, i.e., so as to form a cross-Nicol relationship. Then, light is emitted to one of the polarizing films from an outside thereof, and resulting transmitted light is observed from the side of the other polarizing film to determine whether or not a bright point is present. When an irregularity, flaw or the like exists in at least one of the polarizing films, such a point becomes different from the remaining region, in terms of an optical phenomenon such as refraction or scattering of light, and thereby can be recognized as a bright point. The cross-Nicol method is designed to inspect a bright point based on the above principle.

Through the defect inspection by the cross-Nicol method, the inventers have found that, even using the same polarizing film, whether or not a bright point arising from the polarizing film is visually recognized depends on how to orient the polarizing film with respect to a counterpart polarizing plate (film) capable of forming the cross-Nicol relationship. Specifically, the inventors have found that viewability of a bright point becomes different, depending on which of a surface of a polarizing film as a contact surface with a thermoplastic resin film substrate during production thereof, and the other, opposite, surface of the polarizing film, is disposed to be oriented toward a counterpart polarizing plate (film). The present invention has been accomplished based on this founding.

Solution to the Technical Problem

According to one aspect of the present invention, there is provided an optical display device which comprises a display panel, and at least one polarizing film including a polyvinyl alcohol-based resin layer disposed on a viewing side with respect to the display panel, and having an optical arrangement forming a cross-Nicol relationship with regard to polarized light entering the polarizing film from the side of the display panel, wherein the polarizing film is produced to have a thickness of 10 µm or less, by a method comprising the steps of: forming a polyvinyl alcohol-based resin layer on a resin substrate; stretching the polyvinyl alcohol-based resin layer integrally with the resin substrate; and dyeing the polyvinyl alcohol-based resin layer using a dichroic material, and disposed in the optical display device in a state in which a surface of the polarizing film as a contact surface with the resin substrate during the production thereof is oriented toward a side opposite to the display panel.

In the present invention, even if the polarizing film has some defects, a bright point caused by the polarizing film becomes less visually recognizable, so that it becomes possible to provide an optical display device capable of minimizing visual recognizability of a bright point. The polarizing film is desirably produced to have a thickness of 10 µm or less. This makes it possible to facilitate downsizing of the optical display device.

In the present invention, the optical display device may be a liquid crystal display device or an organic EL display device.

When the above optical display device is a liquid crystal display device, the liquid crystal display device may comprises a first polarizing film and a second polarizing film each produced to have a thickness of 10 µm or less, by a method comprising the steps of: forming a polyvinyl alcohol-based resin layer on a resin substrate; stretching the polyvinyl alcohol-based resin layer integrally with the resin substrate; and dyeing the polyvinyl alcohol-based resin layer using a dichroic material, wherein the first polarizing film is disposed on the viewing side with respect to the display panel, in a state in which a surface of the first polarizing film as a contact surface with the resin substrate during the production thereof is oriented toward a side opposite to the display panel, and the second polarizing film is disposed on a non-viewing side with respect to the display panel, and wherein the first polarizing film forms the cross-Nicol relationship with regard to polarized light entering the first polarizing film from the side of the display panel after penetrating through the second polarizing film.

Preferably, in this optical display device, the second polarizing film is disposed in a state in which a surface of the second polarizing film as a contact surface with the resin substrate during the production thereof is oriented toward a side opposite to the display panel. Thus, even if the first or second polarizing film has some defects, a bright point caused by the polarizing film becomes less visually recognizable, so that it becomes possible to provide an optical display device capable of minimizing visual recognizability of a bright point.

When the optical display device is a liquid crystal display device, each of the first and second polarizing films may comprise a protective layer provided at least on the side opposite to the display panel.

The above optical display device may be a VA-mode liquid crystal display device or an IPS-mode liquid crystal display device. When the optical display device is a VA-mode liquid crystal display device, the VA-mode liquid crystal display device may have a VA-mode liquid crystal cell as the display panel, wherein the VA-mode liquid crystal display device further comprises a phase difference film provided between the display panel and the first polarizing film. On the other hand, when the optical display device is an IPS-mode liquid crystal display device, the IPS-mode liquid crystal display device may have an IPS-mode liquid crystal cell as the display panel.

The above optical display device may be an organic EL display device. In this case, the organic EL display device may comprises the display panel, a ¼ wavelength phase difference film, a polarizing film and a protective film which are arranged in this other, wherein the polarizing film is produced to have a thickness of 10 µm or less, by a method comprising the steps of: forming a polyvinyl alcohol-based resin layer on a resin substrate; stretching the polyvinyl alcohol-based resin layer integrally with the resin substrate; and dyeing the polyvinyl alcohol-based resin layer using a dichroic material, and disposed on the viewing side with respect to the display panel, in a state in which a surface of the polarizing film as a contact surface with the resin substrate during the production thereof is oriented toward a side opposite to the display panel, and wherein the polarizing film forms the cross-Nicol relationship with regard to polarized light which, after penetrating through the polarizing film from the viewing side and then undergoing a reflection at the display panel, re-enters the polarizing film from the side of the display panel.

For example, in the optical display device of the present invention, the polarizing film can be produced to have a thickness of 10 µm or less, by: subjecting, integrally with a non-crystallizable ester-based thermoplastic resin substrate, a PVA-based resin layer applied and formed on the resin substrate, to a 2-stage stretching process consisting of preliminary in-air stretching and in-boric-acid-solution stretching; and subjecting the PVA-based resin layer to a dyeing treatment using a dichroic material.

Effect of the Invention

The present invention makes it possible to allow a bright point caused by a polarizing film capable of forming a cross-Nicol relationship to become less visually recognizable, thereby enhancing equality of the optical display device.

DESCRIPTION OF EMBODIMENTS

1. Production of Polarizing Film

A polarizing film of the present invention is produced by a method comprising: a laminate preparation step of forming a PVA-based resin layer on a thermoplastic resin substrate; a stretching step of stretching the PVA-based resin layer integrally with the thermoplastic resin substrate; and a dyeing step of causing a dichroic material to be absorbed in the PVA-based resin layer. This method may be configured using any suitable conventional technique. The stretching step may be performed before the dyeing step, or may be performed after the dyeing step. Further, in the stretching step, it is possible to employ either one of in-air stretching, and in-solution stretching, such as in-boric-acid-solution stretching. Further, the stretching may be single-stage stretching, or may be a 2-stage stretching.

In the polarizing film method, in addition to respective treatments in the laminate preparation step, the stretching step and the dyeing step, it is possible to employ any other treatment, such as an insolubilization treatment, a cross-linking treatment, a drying treatment and/or a cleaning treatment, according to need.

Figure 1:
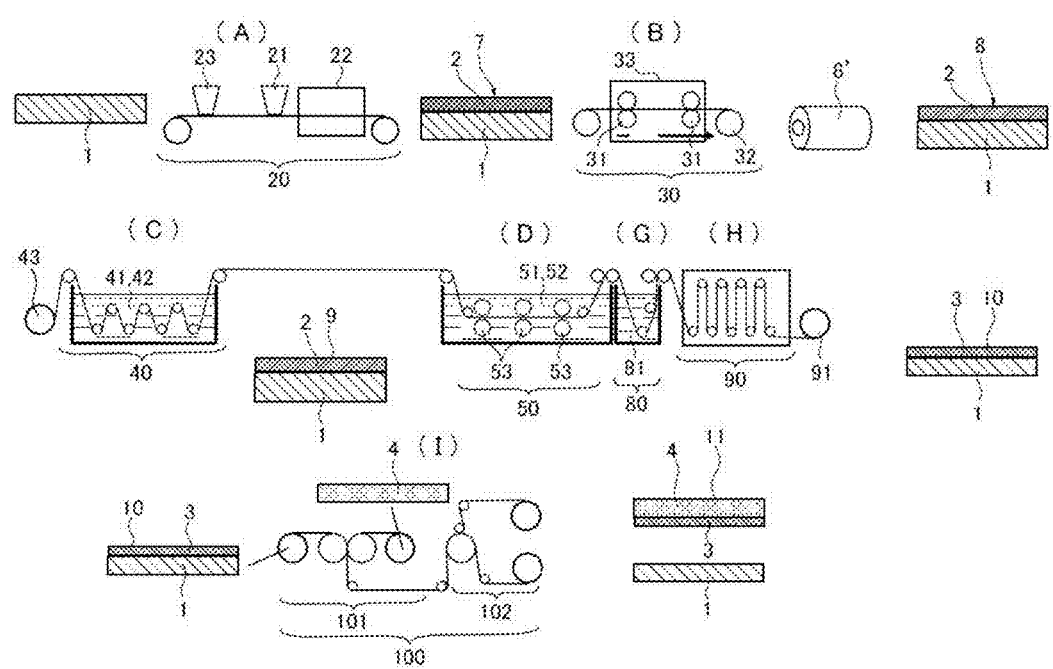
FIG. 1 is a schematic diagram illustrating one example of a polarizing film production method.

With reference to FIG. 1, one example of a production method for a polarizing film 3 will be described. This method is the same as one example of a production method disclosed in JP 4751481B. Particularly, it should be note that, in this application, the polarizing film 3 is produced by stretching a polyvinyl alcohol-based resin layer formed on a resin substrate, integrally with the resin substrate.

[Laminate Preparation Step (A)]

Firstly, a non-crystallizable ester-based thermoplastic resin (e.g., isophthalic acid-copolymerized polyethylene terephthalate copolymerized with 6 mol % of isophthalic acid) substrate 1 (hereinafter referred to as "non-crystallizable PET") 1 having a glass transition temperature of 75° C. and a thickness of 200 µm, and a PVA aqueous solution obtained by dissolving a PVA powder having a polymerization degree of 1000 or more and a saponification degree of 99% or more, in water to have a concentration of 4 to 5 wt %, are prepared. Then, in a laminate preparation apparatus 20 equipped with a coating device 21, a drying device 22 and a surface modifying unit 23, the PVA aqueous solution is applied to the non-crystallizable PET substrate 1, and dried at a temperature of 50 to 60° C., to form, on the PET substrate 1, a 7 µm-thick PVA layer 2 having a glass transition temperature of 80° C. In this manner, a laminate 7 comprising the 7 µm-thick PVA layer is prepared. During this step, a surface of the PET substrate 1 may be subjected to a corona treatment by the surface modifying unit 23, to thereby enhance adhesion between the non-crystallizable PET substrate 1 and the PVA layer 2 formed on the non-crystallizable PET substrate 1.

Subsequently, the laminate 7 comprising the PVA layer will be finally produced as a 3 µm-thick polarizing film 3 through the following steps including a 2-stage stretching process consisting of preliminary in-air stretching and in-boric-acid-solution stretching.

[Preliminary in-Air Stretching Step (B)]

In a first-stage preliminary in-air stretching step (B), the laminate 7 including the 7 μm-thick PVA layer 2 is stretched integrally with the PET substrate 1 to form a "stretched laminate 8" including a 5 μm-thick PVA layer 2. Specifically, in a preliminary in-air stretching apparatus 30 having a stretching device 31 provided within an oven 33, the laminate 7 including the 7 μm-thick PVA layer 2 is subjected to free-end uniaxial stretching through the stretching device 31 within the oven 33 set to an atmosphere at a stretching temperature of 130° C., so as to attain a stretching ratio of 1.8 times, thereby forming a stretched laminate 8. At this stage, a roll 8' of the stretched laminate 8 can be produced by using a take-up unit 32 provided in side-by-side relation to the oven 33.

[Dyeing Step (C)]

Then, in the dyeing step (C), a dyed laminate 9 is formed in which iodine as a dichroic material is absorbed in the 5 μm-thick PVA layer 2 having oriented PVA molecules. Specifically, in a dyeing apparatus 40 equipped with a dyeing bath 42 of a dyeing solution 41 containing iodine and potassium iodide, the stretched laminate 8 unrolled from a feeding unit 43 provided in side-by-side relation to the dyeing apparatus 40 and loaded with the roll 8' is immersed in the dyeing solution 41 at a solution temperature of 30° C., for an appropriate time, to allow a PVA layer making up a target polarizing film 3 to be finally formed, to have a single transmittance of 40 to 44%. In this manner, a dyed laminate 9 was formed in which iodine is absorbed in the molecularly-oriented PVA layer 2 of the stretched laminate 8.

In this step, in order to prevent dissolution of the PVA layer 2 comprised in the stretched laminate 8, the dyeing solution 41 is prepared using water as a solvent to have an iodine concentration of 0.30 wt %. Further, in the dyeing solution 41, a concentration of potassium iodide for allowing iodine to be dissolved in water is set to 2.1 wt %. A concentration ratio of iodine to potassium iodide is 1:7. More specifically, the stretched laminate 8 is immersed in the dyeing solution 41 having an iodine concentration of 0.30 wt % and a potassium iodide concentration of 2.1 wt %, for 60 seconds, to form a dyed laminate 9 in which iodine is absorbed in the 5 μm-thick PVA layer 2 having oriented PVA molecules.

[In-Boric-Acid-Solution Stretching Step (D)]

In a second-stage in-boric-acid-solution stretching step (D), the dyed laminate 9 comprising the PVA layer 2 having molecularly-oriented iodine is further stretched to form an optical film laminate 10 which comprises the PVA layer having molecularly-oriented iodine and making up a 3 μm-thick polarizing film 3. Specifically, in an in-boric-acid-solution stretching apparatus 50 equipped with a stretching device 53 and a boric acid bath 52 of a boric acid aqueous solution 51 containing boric acid and potassium iodide, the dyed laminate 9 continuously fed from the dyeing apparatus 40 is immersed in the boric acid aqueous solution 51 set to an atmosphere at a stretching temperature of 65° C., and then subjected to free-end uniaxial stretching through the stretching device 53 provided in the in-boric-acid-solution stretching apparatus 50, so as to attain a stretching ratio of 3.3 times, thereby forming an optical film laminate 10 comprising a 3 μm-thick PVA layer.

[Cleaning Step (G)]

Then, preferably, the optical film laminate 10 comprising the polarizing film 3 is directly fed to a cleaning step (G). The cleaning step (G) is intended to wash out unnecessary residuals adhered on a surface of the polarizing film 3. Alternatively, the cleaning step (G) may be omitted, and the optical film laminate 10 comprising the polarizing film 3 may be directly fed to a drying step (H).

[Drying Step (H)]

The cleaned optical film laminate 10 is fed to the drying step (H) and dried therein. Then, the dried optical film laminate 10 is wound on a take-up unit 91 provided in side-by-side relation to the drying apparatus 90, as a continuous web of the optical film laminate 10, to form a roll of the optical film laminate 10 comprising the polarizing film 3. In the drying step (H), any suitable technique, such as natural drying, blow drying and thermal drying, may be employed. For example, the drying may be performed by warm air at 60° C., for 240 seconds in an oven type drying apparatus 90.

[Lamination/Transfer Step (I)]

The optical film laminate 10 comprising the 3 μm-thick polarizing film 3 formed on the PET substrate 1 is finished into the roll of optical film laminate 10, and the roll of optical film laminate 10 can be simultaneously subjected to a lamination operation and a transfer operation, in the following manner. A thickness of a polarizing film 3 to be produced is set to 10 μm or less, typically to only about 2 to 5 μm, based on thinning by the stretching. Thus, it is difficult to handle such a thin polarizing film 3 as a single-layer body. For this reason, the polarizing film 3 is handled, for example, in the form of an optical film laminate 10 obtained by forming the polarizing film 3 on the PET substrate 1, or, in the form of an optically functional film laminate 11 obtained by laminating/transferring the polarizing film 3 to an optically functional film 4 capable of functioning as a polarizer film protection film, through a bonding agent.

In the lamination/transfer step (I), the polarizing film 3 comprised in the continuous web of optical film laminate 10, and the optically functional film 4 are laminated together through a bonding agent and taken up. In this take-up step, an optically functional film laminate 11 is formed by transferring the polarizing film 3 to the optically functional film 4 while peeling the PET substrate 1 from the polarizing film 3. Specifically, the optical film laminate 10 is unrolled from the roll by an unrolling/laminating unit 101 comprised in a laminating/transferring apparatus 100, and the polarizing film 3 of the unrolled optical film laminate 10 is transferred to the optically functional film 4 by a taking-up/transferring unit 102. In the course of this operation, the polarizing film 3 is peeled from the PET substrate 1, and formed as the optically functional film laminate 11.

2. Defect-Causing Mechanism

Figure 2:
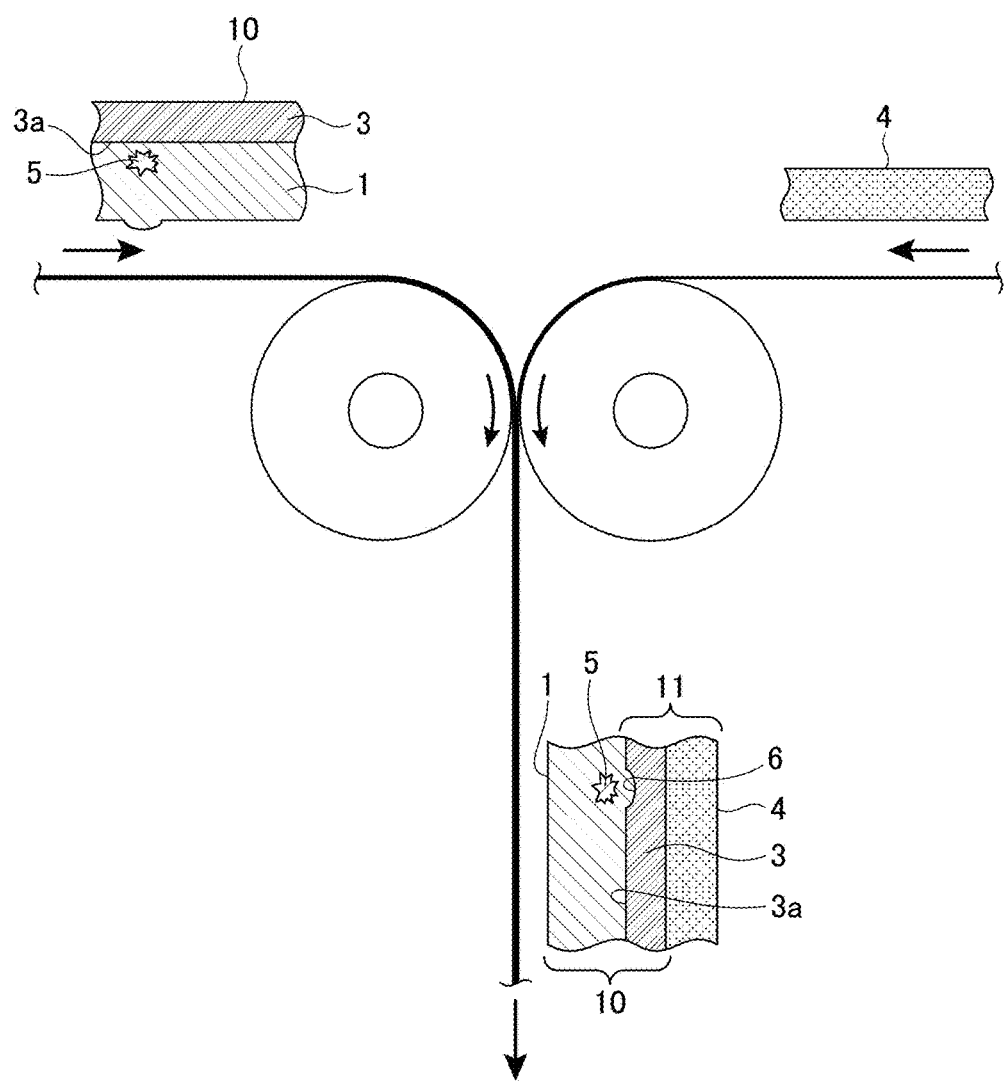
FIG. 2 is an explanatory diagram of a mechanism causing a defect in a polarizing film.

With reference to FIG. 2, one example of a mechanism causing a defect 6 in a polarizing film 3. FIG. 2 is a fragmentary partially enlarged diagram of the unrolling/laminating unit 101 in FIG. 1. For example, in a situation where a foreign substance 5 such as a metal piece is mixed into the PET substrate 1, when the polarizing film 3 is laminated to the optically functional film 4, the foreign substance 5 damages the polarizing film 3 through a pressure of a nip between rollers. As a result of microscopic inspection, it was proven that this damage appears as a defect, such as an irregularity in a surface 3a of the polarizing film 3. Obviously, when the polarizing film 3 is a thin type having a thickness of 10 μm or less, such an irregularity becomes prominent, and thereby a defect 6 is more likely to occur. When the polarizing film 3 is disposed in a cross-Nicol relation with another polarizing film, this defect 6 is likely to pose a factor causing refraction, scattering or the like of light, and thereby lead to a bright point impairing appearance of an optical display device. This defect problem occurs not only in the situation where the foreign substance 5 is mixed into the PET substrate 1 itself as illustrated in FIG. 2, but also in a situation where a foreign substance exists on the PET substrate 1, for example, when the PVA layer 2 is formed on the PET substrate 1.

3. Defect Inspection Method and Inspection Result

Figure 3A:
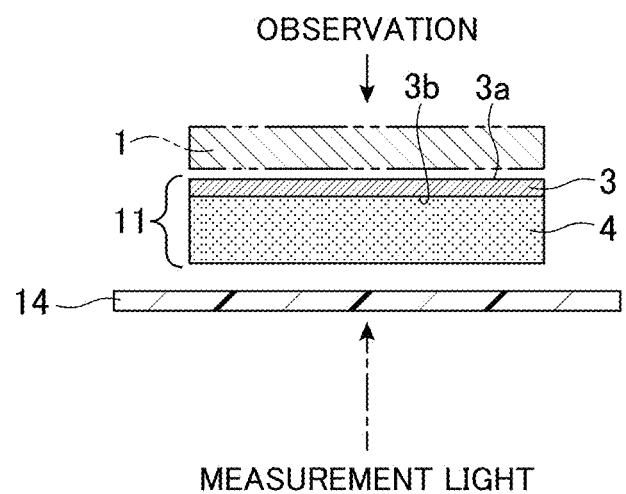
FIGS. 3(a) and 3(b) are, respectively, a schematic diagram illustrating a scheme for observing a defect as a bright point by utilizing a cross-Nicol method, and an inspection result.
Figure 3B:
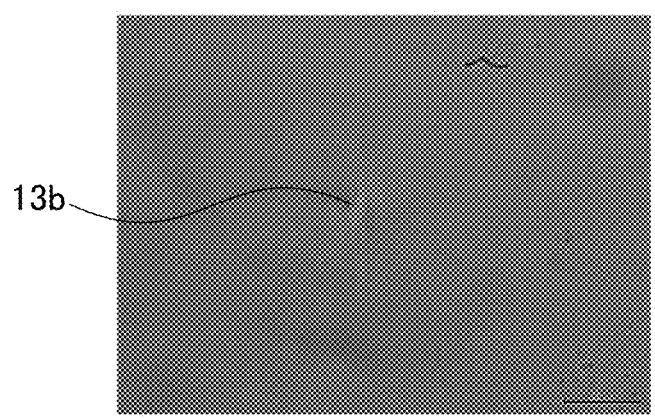
Figure 4A:
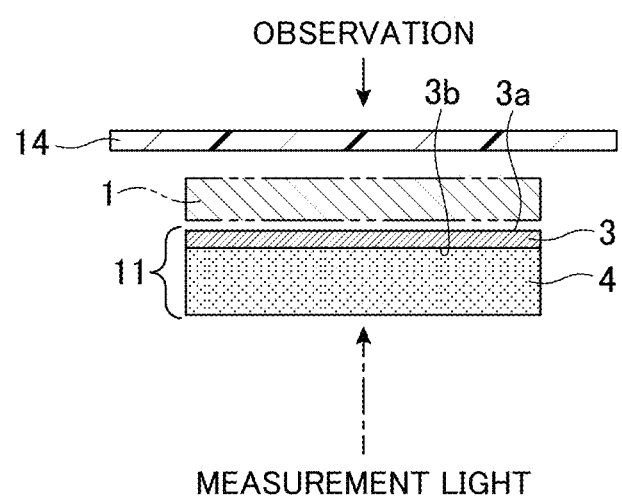
FIGS. 4(a) and 4(b) are, respectively, a schematic diagram illustrating a scheme for observing a defect as a bright point by utilizing a cross-Nicol method, and an inspection result.
Figure 4B:
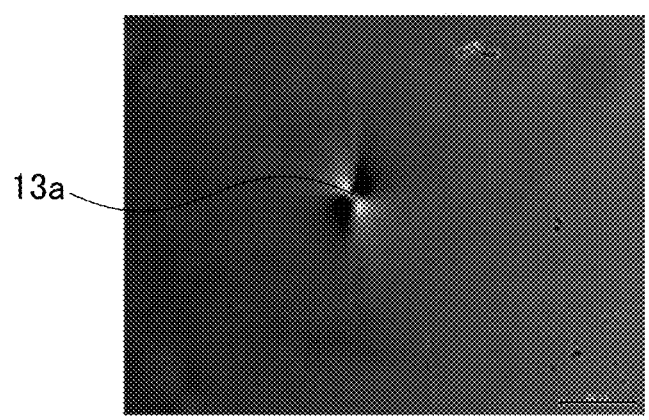

FIGS. 3(*a*) and 3(*b*) (FIGS. 4(*a*) and 4(*b*)) illustrate a scheme for observing a defect as a bright point by utilizing a cross-Nicol method, and an inspection result, respectively. More specifically, FIGS. 3(*a*) and 4(*a*) are schematic diagrams illustrating a scheme for defect inspection by the cross-Nicol method, and FIGS. 3(*b*) and 4(*b*) are microscope photographs indicating respective states of bright points 13*a*, 13*b* as inspection results. Generally, the defect inspection is performed under a condition that the PET substrate 1 is removed, in other words, in the form of the optical function film laminate 11. In FIGS. 3(*a*) and 4(*a*), the PET substrate 1 is indicated by the two-dot chain line, for convenience sake.

In advance of the defect inspection, a polarizing film 3 to be inspected is disposed in opposed relationship to another polarizing plate 14 to allow their absorption axes to become orthogonal to each other. Measurement light is emitted from one side of the polarizing film 3 or the polarizing plate 14 (a non-viewing side) in such a manner that it can penetrate through both of the polarizing film 3 and the polarizing plate 14 disposed in opposed relationship to each other, and, after penetrating through them, observed at the other side (viewing side).

In terms of observation of a bright point, a substantial difference between the inspection scheme in FIG. 3(*a*) and the inspection scheme in FIG. 4(*a*) is only that, in FIG. 3(*a*), one 3*a* of opposite surfaces 3*a*, 3*b* of the polarizing film 3 as a contact surface with the PET substrate 1 during production thereof is oriented toward a side opposite to the polarizing plate 14, whereas, in FIG. 4(*a*), the surface 3*a* of the polarizing film 3 as the contact surface with the PET substrate 1 during production thereof is oriented toward the polarizing plate 14.

In terms of a structure, in FIG. 3(*a*), the measurement light is emitted from the side of the polarizing plate 14, and resulting transmitted light is observed on the side of the polarizing film 3, whereas, in FIG. 4(*a*), the measurement light is emitted from the side of the polarizing film 3, and resulting transmitted light is observed on the side of the polarizing plate 14. Further, in FIG. 3(*a*), an optically functional film 4 is disposed between the polarizing film 3 and the polarizing plate 14, whereas, in FIG. 4(*a*), the optically functional film 4 is disposed outward of the polarizing film 3 and the polarizing plate 14. As for the former difference, in a state of this test, the direction of the transmitted light does not have a significant influence on the bright point observation. It is obvious that the latter difference does not have any influence on the bright point observation, because the optically functional film 4 is made of a transparent material, and has no polarization function.

As is evidenced from the inspection results illustrated in FIGS. 3(*b*) and 4(*b*), the above substantial difference appears as a significant difference regarding a bright point to be observed. That is, as illustrated in FIG. 3(*b*), the bright point 13*a* obtained by the inspection scheme in FIG. 3(*a*) obviously emits stronger light, i.e., the bright point 13*a* is further highlighted, as compared to the bright point 13*b* obtained by the inspection scheme in FIG. 4(*a*). Considering this, the orientation of each of the surfaces 3*a*, 3*b* of the polarizing film 3 is important in allowing a bright point, i.e., a defect (6) on the polarizing film 3, to become less visually recognizable. For example, it is proven that the surface 3*a* of the polarizing film as a contact surface with the PET substrate 1 during the production thereof is desirably disposed to be oriented toward a side opposite to the polarizing plate 14.

4. Device Configuration

Figure 5:
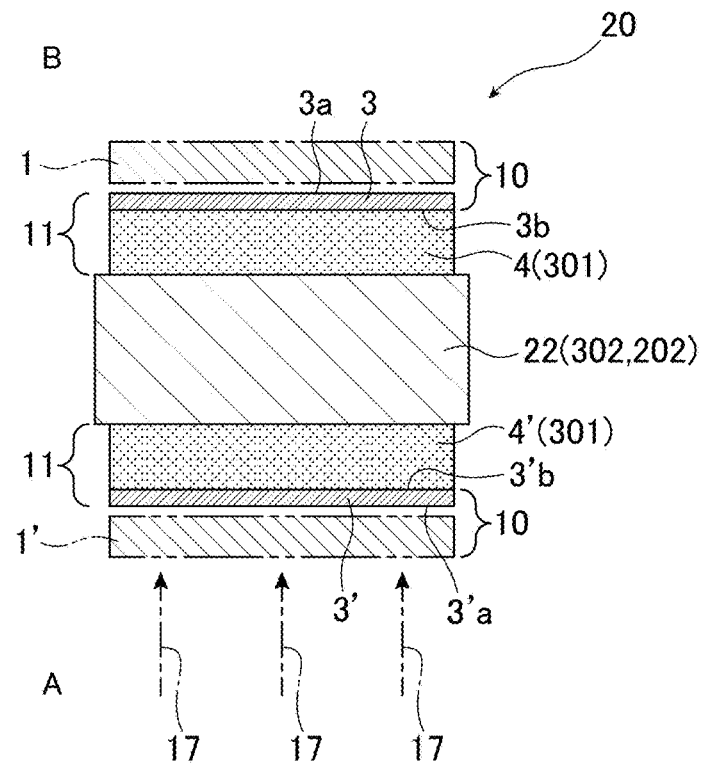
FIG. 5 is a schematic sectional view illustrating a device configuration capable of satisfying a preferred orientational condition regarding a surface of a polarizing film.
Figure 6:
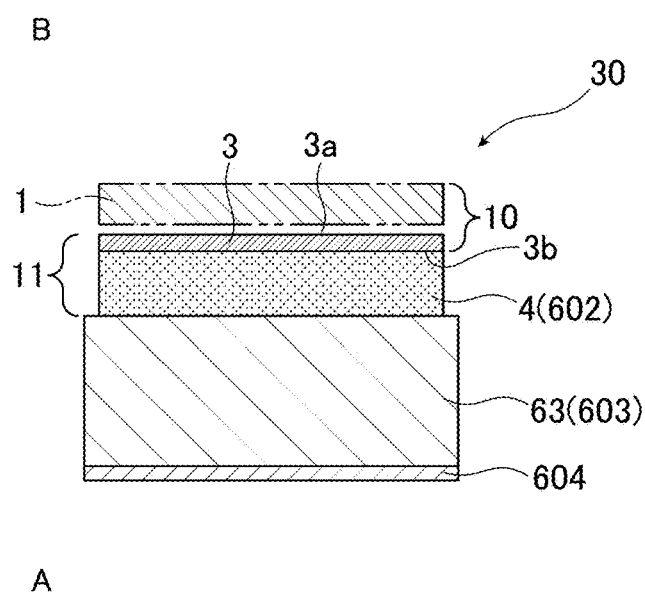
FIG. 6 is a schematic sectional view illustrating a device configuration capable of satisfying a preferred orientational relationship regarding a surface of a polarizing film.

FIGS. 5 and 6 are schematic sectional views illustrating examples of a device configuration capable of satisfying the aforementioned preferred orientational relationship regarding a surface of a polarizing film.

FIG. 5 schematically illustrates a device configuration of a liquid crystal display device 20. The liquid crystal display device 20 may have a symmetric structure. The liquid crystal display device 20 comprises, as primary components, a display panel 22, an optically functional film 4 (4') and a polarizing film 3 (3'), which are arranged in this order, wherein each pair of the optically functional films 4, 4' and polarizing films 3, 3' are arranged in symmetric relation with respect to the display panel 22. The liquid crystal display device 20 may further comprise a PET substrate 1' as a protective layer.

The liquid crystal display device 20 may be a VA-mode liquid crystal display device or an IPS-mode liquid crystal display device. When the liquid crystal display device 20 is a VA-mode liquid crystal display device, a VA-mode liquid crystal cell 302 is used as the display panel 22, and a phase difference film is used as each of the optically functional films 4, 4'. On the other hand, when the liquid crystal display device 20 is an IPS-mode liquid crystal display device, an IPS-mode liquid crystal cell 202 is used as the display panel 22.

Irrespective of whether the liquid crystal display device 20 is a VA-mode liquid crystal display device or an IPS-mode liquid crystal display device, it comprises two polarizing films 3, 3'. Thus, the polarizing film 3 can form a cross-Nicol relationship with regard to polarized light entering the polarizing film 3 after penetrating through the polarizing film 3' from a non-viewing side A on which a backlight 17 is provided, toward a viewing side B. Therefore, the device configuration can satisfy the aforementioned preferred orientational relationship regarding a surface of a polarizing film.

Specifically, in accordance with the aforementioned orientational relationship, as illustrated in FIG. 5, as for the polarizing film 3 disposed on the viewing side B, it is desirable that a surface 3*a* as a contact surface with a PET substrate 1 during production thereof is disposed to be oriented toward a side opposite to the polarizing film 3', i.e., toward a side opposite to the display panel 22 (toward the viewing side B). Further, as for the polarizing film 3' disposed on the non-viewing side A, it is desirable that a surface 3'*a* as a contact surface with the PET substrate 1 during production thereof is disposed to be oriented toward a side opposite to the polarizing film 3, i.e., toward a side opposite to the display panel 22 (toward the non-viewing side A).

This orientational relationship can also be applied to an organic EL display device. FIG. 6 schematically illustrates a device configuration of an organic EL display device 30. The organic EL display device 30 comprises, as primary components, a display panel 63 composed of an organic EL cell 603, an optically functional film 4 composed of a ¼ wavelength phase difference layer 602, and a polarizing film 3, which are arranged in this order. The organic EL display device 30 may further comprise a PET substrate 1' as a protective layer. The organic EL cell 603 comprises, for example, a metal electrode 604.

Differently from the liquid crystal display device 20 illustrated in FIG. 5, the organic EL display device 30 comprises only one polarizing film 3. Thus, with regard to light generated from the organic EL cell 603, the cross-Nicol relationship is not established. However, as described later with reference to FIGS. 7 and 8, with respect to external light from an outside of the organic EL display device 30, such as direct sunlight, the one polarizing film 3 is likely to substantially function as two polarizing films, causing a bright point. Thus, external light becomes a major problem for mobile devices which can be used outdoors.

Figure 7:
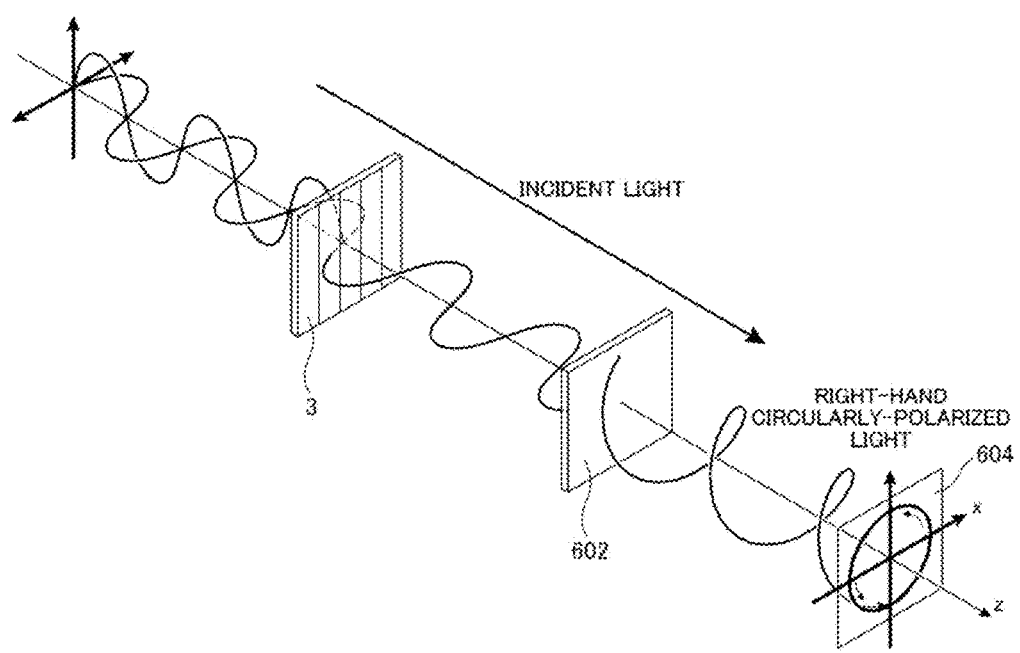
FIG. 7 is an explanatory diagram of a cross-Nicol relationship in an organic EL display device.
Figure 8:
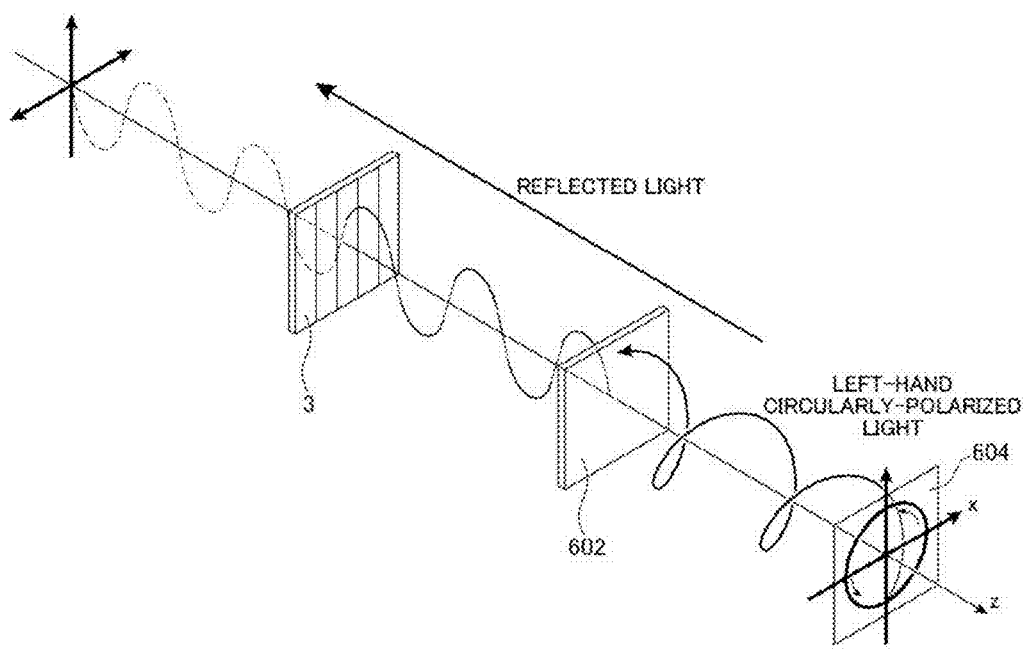
FIG. 8 is an explanatory diagram of a cross-Nicol relationship in an organic EL display device.

FIG. 7 illustrates in what manner incident light (external light) from the outside of the organic EL display device 30 is changed by the polarizing film 3, the ¼ wavelength phase difference layer 602, and the organic EL cell 603, particularly, the metal electrode 604 comprised in the organic EL cell 603. FIG. 8 illustrates in what manner reflected light from the metal electrode 604 is changed by the above components.

As illustrated in FIG. 7, the incident light is changed to certain directional linearly-polarized light through the polarizing film 3, and then changed to a circularly-polarized light, e.g., right-hand circularly-polarized light, through the ¼ wavelength phase difference layer 602. The right-hand circularly-polarized light is reflected at an interface of the metal electrode 604 comprised in the organic EL cell 603, and consequently reversed to left-hand circularly-polarized light as illustrated in FIG. 8. Further, the circularly-polarized light is changed to 90-degree rotated linearly-polarized light through the ¼ wavelength phase difference layer 602. Fundamentally, the 90-degree rotated linearly-polarized light is incapable of passing through the polarizing film 3. However, when the incident light is strong light such as direct sunlight, a part of the linearly-polarized light is likely to pass through the polarizing film 3. In this case, after penetrating through the polarizing film 3 from a viewing side, the incident light undergoes a reflection at the metal electrode 604, and penetrates through the polarizing film 3 from a non-viewing side again. As a result, the incident light penetrates through substantially two polarizing films, as with the liquid crystal display device 20 illustrated in FIG. 5. In other words, the cross-Nicol relationship is established with regard to polarized light which, after penetrating through the polarizing film a viewing side B and then undergoing a reflection at the metal electrode 604 of the organic EL cell, re-enters the polarizing film 3 from a non-viewing side A. As above, as with the liquid crystal display device 20 illustrated in FIG. 5, the aforementioned preferred orientational relationship regarding the surface of the polarizing film can also be applied to an organic EL display device.

In this case, in accordance with the aforementioned orientational relationship, it is desirable that one 3a of opposite surfaces 3a, 3b of the polarizing film 3 as a contact surface with a PET substrate 1 during production thereof is disposed to be oriented toward a side opposite to the polarizing film 3 itself, i.e., toward a side opposite to the display panel 63 (toward the viewing side B).

5. Examples of Configuration of Optically Functional Film Laminate

Figure 9:
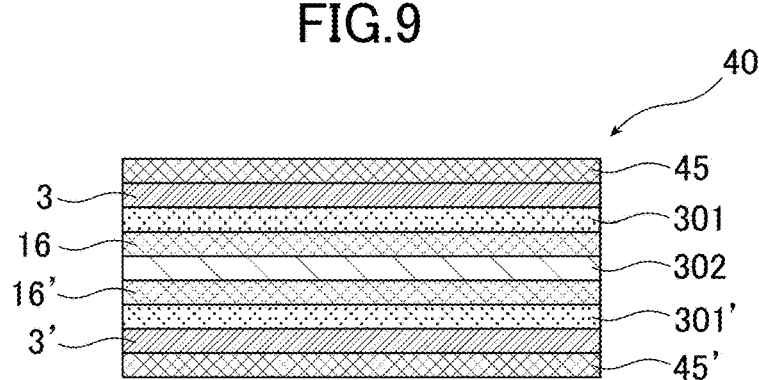
FIG. 9 is a schematic diagram illustrating one example of a configuration of an optically functional film laminate usable in a VA-mode liquid crystal display device.
Figure 10:
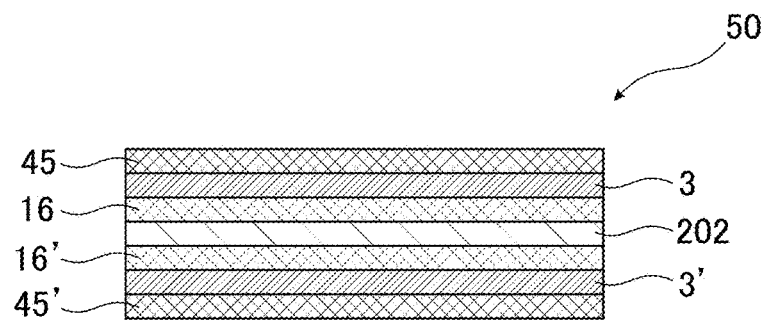
FIG. 10 is a schematic diagram illustrating one example of a configuration of an optically functional film laminate usable in an IPS-mode liquid crystal display device.
Figure 11:
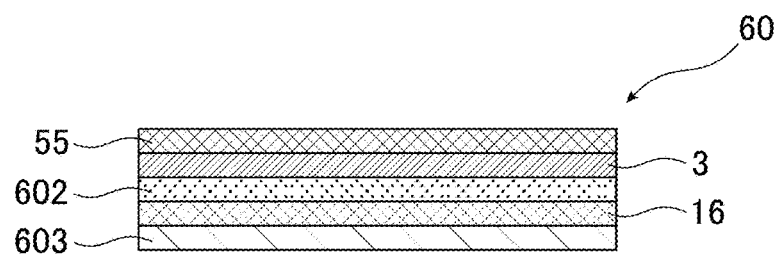
FIG. 11 is a schematic diagram illustrating one example of a configuration of an optically functional film laminate usable in an organic EL display device.

With reference to FIGS. 9 to 11, some examples of a configuration of an optically functional film laminate usable in the device configurations in FIGS. 5 and 6.

5-1. VA-Mode Liquid Crystal Display Device

FIG. 9 illustrates one example of a configuration of an optically functional film laminate 40 usable in a VA-mode liquid crystal display device.

The optically functional film laminate 40 comprises a VA-mode liquid crystal display panel 302 used as a liquid crystal cell. For example, the VA-mode liquid crystal display panel 302 comprises a liquid crystal layer and a transistor substrate. The optically functional film laminate 40 has a symmetric shape with respect to the display panel 302. A phase difference film 301 (301') and a polarizing film 3 (3') are laminated on and bonded to the display panel 302 in this order, through an adhesive layer 16 (16'), and further a protective layer 45 (45') is laminated on the polarizing film 3 (3'). For example, the optically functional film laminate 40 may be used in a posture where the protective layer 45 is located on a viewing side B, and the protective layer 45' is located on a non-viewing side A.

Each of the adhesive layer 16, 16 is an optically transparent layer. For example, it is possible to use one or more appropriately selected from various types comprising, as a base polymer, a polymer such as acrylic-based polymer, silicone-based polymer, polyester, polyurethane, polyamide, polyether, fluorine or rubber-based polymer, isocyanate based polymer, polyvinyl alcohol-based polymer, gelatin-based polymer, vinyl-based latex, or water-based polyester. Although particularly not illustrated, adjacent ones of the phase difference film, the polarizing film and the protective layer may be bonded together using an adhesive. The use of an adhesive makes it possible to reduce a loss of light.

For example, each of the phase difference films 301, 301' may be a biaxial phase difference film having the following relationship: nx>nz>ny, or may be a biaxial phase difference film having the following relationship: nx>ny>nz, where: nx and ny are refractive indexes in in-plane x-axis and y-axis directions, respectively; and nz is a refractive index in a thickness direction. Alternatively, each of the phase difference films 301, 301' may be a phase difference film having the following relationship: nx>ny≈nz, or may be a phase difference film having the following relationship: nx≈ny>nz. In either case, the phase difference film is disposed to have a relationship in which a slow axis direction forms an angle of 0 degree or 90 degrees with respect to a direction of an absorption axis of the polarizing film. This arrangement is effective in compensation for a phase difference from liquid crystal molecules in a thickness direction, in addition to correction of a crossing angle between polarizing films for oblique viewing.

As long as each of the polarizing films 3, 3' is produced by stretching a PVA-based resin layer formed on a resin substrate for stretching, integrally with the resin substrate, any production method may be used therefor. For example, the aforementioned method may be used. For example, as the resin substrate, a thermoplastic crystallizable resin may be used, as well as the aforementioned non-crystallizable ester-based thermoplastic resin. For example, the crystallizable resin may include olefin-based resins such as polyethylene (PE) and polypropylene (PP), and ester-based resins such as polyethylene terephthalate (PET) and polybutylene terephthalate (PBT). One feature of such a crystallizable resin is that, when it is subjected to heating and/or stretching/molecular orientation, polymer molecules are orderly arranged and crystallization is progressed. Physical properties of the resin vary according to the degree of crystallization. However, even in the crystallizable resin such as polypropylene (PP) or polyethylene terephthalate (PET), it is possible to suppress crystallization by inhibiting orderly orientation of polymer molecules which would otherwise be caused by heating or stretching/molecular orientation. Such crystallization-inhibited polypropylene (PP) and polyethylene terephthalate (PET) will hereinafter be referred to respectively as "non-crystallizable polypropylene" and "non-crystallizable polyethylene terephthalate", and referred to respectively and collectively as "non-crystallizable olefin-based resin" and "non-crystallizable ester-based resin". The non-crystallizable olefin-based or non-crystallizable ester-based thermoplastic resin may be used for the resin substrate.

Each of the protective layers 45, 45' is made of a transparent resin material, and may be composed, for example, of the thermoplastic resin substrate stretched together with the PVA-based resin layer as mentioned above. When the PET substrate 1 is used as the viewing-side protective layer 45, a surface-treated layer (not illustrated) is formed as a surface thereof. In this way, the PET substrate 1 (1') may be directly used as the protective layer 45 (45') without peeling it from the polarizing film 3 (3'). As a material for the protective layers 45, 45', a thermoplastic resin excellent in transparency, mechanical strength, thermal stability, water blocking capability, isotropy, etc., is typically used. A specific example of such a thermoplastic resin include a cellulose resin such as triacetylcellulose, a polyester resin, a polyethersulfone resin, a polysulfone resin, a polycarbonate resin, a polyamide resin, a polyimide resin, a polyolefin resin, a (meth) acrylic resin, a cyclic polyolefin resin (norbornene-based resin), a polyarylate resin, a polystyrene resin, a polyvinyl alcohol resin, and mixtures thereof. Although not particularly illustrated, a transparent window may be provided outside the protective layer 45.

The configuration in FIG. 9 may be applied to an IPS-mode liquid crystal display device. That is, the above configuration can be used for an IPS-mode liquid crystal display device, by: forming each or one of the phase difference films 301, 301' as a biaxial phase difference film having the following relationship: nx>nz>ny, where: nx is a refractive index in a slow axis direction; ny is a refractive index in an in-plane direction perpendicular to the slow axis direction; and nz is a refractive index in a thickness direction; and forming the phase difference film 301' as a two-layer structure consisting of a biaxial phase difference film having the following relationship: nx>nz>ny, and a biaxial phase difference film having the following relationship: nx>ny>nz. In this configuration, each of the phase difference films is disposed to have a relationship in which the slow axis direction forms an angle of 0 degree or 90 degrees with respect to a direction of an absorption axis of the polarizing film. This arrangement is effective in correction of a crossing angle between polarizing films for oblique viewing.

5-2. IPS-Mode Liquid Crystal Display Device

FIG. 10 illustrates one example of a configuration of an optically functional film laminate 50 usable in an IPS-mode liquid crystal display device.

The optically functional film laminate 50 comprises an IPS-mode liquid crystal display panel 202 used as a liquid crystal cell, and has a symmetric shape with respect to the display panel 202. A polarizing film 3 (3') is laminated on and bonded to the display panel 202 through an adhesive layer 16 (16'), and further a protective layer 45 (45') may be laminated on the polarizing film 3 (3'). For example, the optically functional film laminate 50 may be used in a posture where the protective layer 45 is located on a viewing side B, and the protective layer 45' is located on a non-viewing side A.

In an embodiment where the protective layer 45 (45') is directly joined to the polarizing film 3 (3') as illustrated in FIG. 10, the protective layer 45 (45') may be composed of the thermoplastic resin substrate subjected to stretching together with the PVA-based resin layer during production of the polarizing film 3 (3'). In this case, the thermoplastic resin substrate may be non-crystallizable polyethylene terephthalate (PET). Although not particularly illustrated, a transparent window may be provided outside the protective layer 45.

Details of each of the layers may be considered to be substantially identical to those in the optically functional film laminate 40 illustrated in FIG. 9.

5-3. Organic EL Display Device

FIG. 11 illustrates one example of a configuration of an optically functional film laminate 60 usable in an organic EL display device.

The optically functional film laminate 60 comprises an organic EL display panel 603 used as a liquid crystal cell. For example, the organic EL display panel 603 comprises, as a light emitter (organic electroluminescence light emitter), a transparent substrate, and a transparent electrode, an organic light-emitting layer and a metal electrode 604, which are laminated on the transparent substrate in this order. A ¼ wavelength phase difference film 602 and a polarizing film 3 are laminated on and bonded to the organic EL display panel 603 in this order, through an adhesive layer 16, and further a protective layer 55 is laminated on the polarizing film 3. In this case, a lower side of the display panel 603 is a non-viewing side A, and an upper side of the display panel 603 or the remaining layers such as the polarizing film 3, is a viewing side B.

The ¼ wavelength phase difference film 602 is designed to convert linearly-polarized light from the polarizing film 3 into circularly-polarized light to prevent light reflected at a surface of the display panel 603 from exiting toward the viewing side. Although the ¼ wavelength phase difference film is used as a typical phase difference film, any other suitable phase difference film may be use. In this case, the phase difference film may be formed as a biaxial phase difference film having the following relationship: nx>nz>ny, where: nx is a refractive index in a slow axis direction; ny is a refractive index in an in-plane direction perpendicular to the slow axis direction; and nz is a refractive index in a thickness direction. In this configuration, the ¼ wavelength phase difference film 602 is disposed to have a relationship in which the slow axis direction forms an angle of 45 degrees with respect to a direction of an absorption axis of the polarizing film 3. This also makes it possible to obtain an antireflection function in an oblique direction. Generally, a mirror is provided, but not illustrated, on a back side of the display panel 603. Although particularly not illustrated, a transparent window may be provided outside the protective layer 55. For example, as the protective layer 55, it is possible to use an acrylic-based resin film. In this case, a surface-treated layer (not illustrated) is formed on the viewing side.

Details of each of the layers may be considered to be substantially identical to those in the VA-mode liquid crystal display device 40 illustrated in FIG. 9 or those in the IPS-mode liquid crystal display device 50 illustrated in FIG. 10

EXAMPLES

In the following Inventive Examples and Comparative Examples, evaluation concerning VA-mode liquid crystal display devices, evaluation concerning IPS-mode liquid crystal display devices, and evaluation concerning organic EL display devices, were performed using SHARP 32-inch LCD TV (model number: LC32-SC1), Panasonic 32-inch LCD TV (model number: THL32C3), and LG Display 15-inch OLED TV (product name: 15EL9500), respectively.

Inventive Example 1

The optically functional film laminate 40 having the configuration in FIG. 9 was used. In particular, Inventive Example 1 relates to an appearance evaluation under a condition that, as for the polarizing film 3 disposed on the viewing side, a surface (surface 3a in FIG. 2 and other figures) as a contact surface with the substrate during the production thereof is dispose to be oriented toward a side opposite to the display panel 302 (toward the non-viewing side), and, as for the polarizing film 3' disposed on the non-viewing side, a surface (3a) as a contact surface with the substrate during the production thereof is dispose to be oriented toward a side opposite to the display panel 302 (toward the viewing side).

(Preparation of Polarizing Film)

A polarizing film prepared by wet stretching was used. First of all, in order to enhance adhesion between a non-crystallizable PET substrate and a PVA layer to be formed thereon, the non-crystallizable PET substrate was subjected to a corona treatment (58 W/m²/min) Then, an aqueous solution of PVA (polymerization degree: 4200, saponification degree: 99.2%) was applied onto the non-crystallizable PET substrate in such a manner as to allow a thickness thereof after drying to become 10 μm, and dried at 60° C. for 10 minutes to form a laminate. Then, the laminate was subjected to preliminary in-air stretching at a stretching temperature of 130° C. to form a stretched laminate, and then the stretched laminate was subjected to dyeing to form a dyed laminate. Further, the dyed laminate was subjected to in-boric-acid-solution stretching at a stretching temperature of 70° C. In this way, an optical film laminate was formed which comprises the non-crystallizable PET substrate and a 4 μm-thick PVA resin layer stretched (i.e., subjected to the 2-stage stretching) integrally with the non-crystallizable PET substrate at a total stretching ratio of 5.94 times. That is, a polarizing film was formed which comprises a 4 μm-thick PVA resin layer where, through the above 2-stage stretching, PVA molecules of the PVA resin layer formed on the non-crystallizable PET substrate are highly oriented, and iodine absorbed through the dyeing is highly oriented in one direction as a polyiodine ion complex.

(Formation of Defect)

A defect causing a bright point was formed in the polarizing film. In order to form such a defect, calcium carbonate (product name "CALSHITEC Vigot-10" produced by Shiraishi Kogyo Kaisha, Ltd.) was added to a non-crystallizable PET resin during a process of forming the non-crystallizable PET substrate. In this way, an irregularity equivalent to a defect which can occur in a polarizing film was formed in a surface of the non-crystallizable PET substrate.

(Evaluation Method)

An optical film laminate was prepared by laminating, through a bonding agent, a 52 μm-thick phase difference film (cycloolefin polymer film produced by Zeon Corporation) to a surface of the polarizing film on a side opposite to the non-crystallizable PET substrate laminated thereon. Then, the non-crystallizable PET substrate was peeled from the optical film laminate, and a protective layer (triacetylcellulose-based) film (thickness: 80 μm) was laminated to a surface of the PVA resin layer through a bonding agent to prepare a viewing-side polarizing film. In the same manner, a non-viewing-side polarizing film was prepared.

Then, each of the phase difference film of the viewing-side polarizing film and the phase difference film of the non-viewing-side polarizing film was fabricated into an A-4 size and laminated to a respective one of viewing-side and non-viewing-side surfaces of a display panel of a liquid crystal display device through an acrylic-based adhesive (20 μm). The liquid crystal display device was turned on and set to a black display state, in a dark room. In this state, the number of bright points each having a length of at least 150 μm per side in a viewing area was counted.

(Evaluation Result)

The number of observed bright points was one.

Inventive Example 2

The optically functional film laminate 50 having the configuration in FIG. 10 was used. In particular, Inventive Example 2 relates to an appearance evaluation under a condition that, as for the polarizing film 3 disposed on the viewing side, a surface (3a) as a contact surface with the substrate during the production thereof is dispose to be oriented toward a side opposite to the display panel 202 (toward the non-viewing side), and, as for the polarizing film 3' disposed on the non-viewing side, a surface (3a) as a contact surface with the substrate during the production thereof is dispose to be oriented toward a side opposite to the display panel 202 (toward the viewing side).

A polarizing film and a defect were prepared and formed in the same manner as that in Inventive Example 1.

(Evaluation Method)

An optical film laminate was prepared by laminating an acrylic-based adhesive (20 μm) to a surface of the polarizing film. Then, the non-crystallizable PET substrate was peeled from the optical film laminate, and a protective layer (triacetylcellulose-based) film (thickness: 80 μm) was laminated through a bonding agent to prepare a viewing-side polarizing film. In the same manner, a non-viewing-side polarizing film was prepared.

Then, each of the viewing-side and non-viewing-side polarizing films was fabricated into an A-4 size and laminated to viewing-side and non-viewing-side surfaces of a display panel of a liquid crystal display device through the acrylic-based adhesive (20 μm) thereof. The liquid crystal display device was turned on and set to a black display state, in a dark room. In this state, the number of bright points each having a length of at least 150 μm per side in a viewing area was counted.

(Evaluation Result)

The number of observed bright points was two.

Inventive Example 3

The optically functional film laminate 60 having the configuration in FIG. 11 was used. In particular, Inventive Example 3 relates to an appearance evaluation under a condition that a surface (3a) of the polarizing film 3 as a contact surface with the substrate during the production thereof is dispose to be oriented toward a side opposite to the display panel 602 (toward the viewing side).

A polarizing film and a defect were prepared and formed in the same manner as that in Inventive Example 1.

(Evaluation Method)

An optical film laminate was prepared by laminating, through a bonding agent, a ¼ wavelength phase difference film (product name "Pureace WR (S-128)" produced by Teijin Chemicals Ltd.) to a surface of the polarizing film. Then, the non-crystallizable PET substrate was peeled from the optical film laminate, and a protective layer (triacetyl-cellulose-based) film (thickness: 45 μm) was laminated to prepare a circularly-polarizing film. Specifically, the circularly-polarizing film was prepared by arranging a surface of the polarizing film and the ¼ wavelength phase difference film of the functional optical film laminate in such a manner that a slow axis of the ¼ wavelength phase difference film forms an angle of 45 degrees with respect to an absorption axis of the polarizing film.

Then, the ¼ wavelength phase difference film of the circularly-polarizing film was fabricated into an A-4 size and laminated to a display panel of an organic EL display device through an acrylic-based adhesive (20 μm). The organic EL display device was turned on and set to a black display state, in a dark room. In this state, the number of bright points each having a length of at least 150 μm per side in a viewing area was counted.

(Evaluation Result)

The number of observed bright points was one.

Inventive Example 4

The optically functional film laminate 50 having the configuration in FIG. 10 was used. In particular, Inventive Example 4 relates to an appearance evaluation under a condition that, as for the polarizing film 3 disposed on the viewing side, a surface (3*a*) as a contact surface with the substrate during the production thereof is dispose to be oriented toward a side opposite to the display panel 202 (toward the viewing side), and, as for the polarizing film 3' disposed on the non-viewing side, a surface (3*a*) as a contact surface with the substrate during the production thereof is dispose to be oriented toward a side opposite to the display panel 202 (toward the non-viewing side).

A defect was formed in the same manner as that in Inventive Example 1.

(Preparation of Polarizing Film)

A polarizing film prepared by dry stretching was used. A crystallizable PET was used as a resin substrate. Then, a PVA aqueous solution was applied onto the substrate, and dried to form a laminate in which a 7 μm-thick PVA resin layer is formed on the crystallizable PET substrate. Then, the formed laminate was subjected to elevated temperature in-air stretching at a stretching temperature of 110° C. in a free-end uniaxial manner to attain an stretching ratio of 4.0 times to thereby form a stretched laminate. Through this stretching, the PVA resin layer comprised in the stretched laminate is changed to a 3.3 μm-thick PVA resin layer having oriented PVA molecules. Further, the stretched laminate was immersed in a dyeing solution for an arbitrary time, and a dyed laminate taken out of the dyeing solution was dried by a warm air at 60° C. In this way, a polarizing film was formed which comprises a 4 μm-thick PVA resin layer having molecularly-oriented iodine.

(Evaluation Method)

An optical film laminate was prepared by laminating an acrylic-based adhesive (20 μm) to a surface of the polarizing film. Then, the non-crystallizable PET substrate was peeled from the optical film laminate, and a protective layer (triacetylcellulose-based) film (thickness: 80 μm) was laminated through a bonding agent to prepare a viewing-side polarizing film. In the same manner, a non-viewing-side polarizing film was prepared.

Then, each of the viewing-side and non-viewing-side polarizing films was fabricated into an A-4 size and laminated to a respective one of viewing-side and non-viewing-side surfaces of a display panel of a liquid crystal display device through the acrylic-based adhesive (20 μm) thereof. The liquid crystal display device was turned on and set to a black display state, in a dark room. In this state, the number of bright points each having a length of at least 150 μm per side in a viewing area was counted.

(Evaluation Result)

The number of observed bright points was two.

Inventive Example 5

The optically functional film laminate 40 having the configuration in FIG. 9 was used. In particular, Inventive Example 5 relates to an appearance evaluation under a condition that, as for the polarizing film 3 disposed on the viewing side, a surface (3*a*) as a contact surface with the substrate during the production thereof is dispose to be oriented toward a side opposite to the display panel 302 (toward the viewing side), whereas, as for the polarizing film 3' disposed on the non-viewing side, a surface (3*a*) as a contact surface with the substrate during the production thereof is dispose to be oriented toward the display panel 302 (toward the viewing side).

A polarizing film and a defect were prepared and formed in the same manner as that in Inventive Example 1.

(Evaluation Method)

An optical film laminate was prepared by laminating, through a bonding agent, a 52 μm-thick phase difference film (cycloolefin polymer film produced by Zeon Corporation) to a surface of the viewing-side polarizing film. Then, the non-crystallizable PET substrate was peeled from the optical film laminate, and a protective layer (triacetylcellulose-based) film (thickness: 80 μm) was laminated to prepare a viewing-side polarizing film.

Further, another optical film laminate was prepared by laminating, through a bonding agent, a protective layer (triacetylcellulose-based) film (thickness: 80 μm) to a surface of the non-viewing-side polarizing film. Then, the non-crystallizable PET substrate was peeled from the optical film laminate, and a 52 μm-thick phase difference film (cycloolefin polymer film produced by Zeon Corporation) was laminated to prepare a non-viewing-side polarizing film.

Then, each of the phase difference film of the viewing-side polarizing film and the phase difference film of the non-viewing-side polarizing film was fabricated into an A-4 size and laminated to a respective one of viewing-side and non-viewing-side surfaces of a display panel of a liquid crystal display device through an acrylic-based adhesive (20 μm). The liquid crystal display device was turned on and set to a black display state, in a dark room. In this state, the number of bright points each having a length of at least 150 μm per side in a viewing area was counted.

(Evaluation Result)

The number of observed bright points was four.

Comparative Example 1

The optically functional film laminate 40 having the configuration in FIG. 9 was used. In particular, Comparative Example 1 relates to an appearance evaluation under a condition that, as for the polarizing film 3 disposed on the viewing side, a surface (3*a*) as a contact surface with the substrate during the production thereof is dispose to be oriented toward the display panel 302 (toward the non-viewing side), whereas, as for the polarizing film 3' disposed on the non-viewing side, a surface (3*a*) as a contact surface with the substrate during the production thereof is dispose to be oriented toward a side opposite to the display panel 302 (toward the non-viewing side).

A polarizing film and a defect were prepared and formed in the same manner as that in Inventive Example 1.

(Evaluation Method)

An optical film laminate was prepared by laminating, through a bonding agent, a protective layer (triacetylcellulose-based) film (thickness: 80 μm) to a surface of the viewing-side polarizing film. Then, the non-crystallizable PET substrate was peeled from the optical film laminate, and a 52 μm-thick phase difference film (cycloolefin polymer film produced by Zeon Corporation) was laminated to prepare a viewing-side polarizing film.

Further, another optical film laminate was prepared by laminating, through a bonding agent, a 52 μm-thick phase difference film (cycloolefin polymer film produced by Zeon Corporation) to a surface of the non-viewing-side polarizing film. Then, the non-crystallizable PET substrate was peeled from the optical film laminate, and a protective layer (triacetylcellulose-based) film (thickness: 80 μm) was laminated to prepare a non-viewing-side polarizing film.

Then, each of the phase difference film of the viewing-side polarizing film and the phase difference film of the non-viewing-side polarizing film was fabricated into an A-4 size and laminated to a respective one of viewing-side and non-viewing-side surfaces of a display panel of a liquid crystal display device through an acrylic-based adhesive (20 μm). The liquid crystal display device was turned on and set to a black display state, in a dark room. In this state, the number of bright points each having a length of at least 150 μm per side in a viewing area was counted.

(Evaluation Result)

The number of observed bright points was eight.

Comparative Example 2

The optically functional film laminate 40 having the configuration in FIG. 9 was used. In particular, Comparative Example 2 relates to an appearance evaluation under a condition that, as for the polarizing film 3 disposed on the viewing side, a surface (3a) as a contact surface with the substrate during the production thereof is dispose to be oriented toward the display panel 302 (toward the non-viewing side), and, as for the polarizing film 3' disposed on the non-viewing side, a surface (3a) as a contact surface with the substrate during the production thereof is dispose to be oriented toward the display panel 302 (toward the viewing side).

A polarizing film and a defect were prepared and formed in the same manner as that in Inventive Example 1.

(Evaluation Method)

An optical film laminate was prepared by laminating, through a bonding agent, a protective layer (triacetylcellulose-based) film (thickness: 80 μm) to a surface of the viewing-side polarizing film. Then, the non-crystallizable PET substrate was peeled from the optical film laminate, and a 52 μm-thick phase difference film (cycloolefin polymer film produced by Zeon Corporation) was laminated to prepare a viewing-side polarizing film.

Further, another optical film laminate was prepared by laminating, through a bonding agent, a protective layer (triacetylcellulose-based) film (thickness: 80 μm) to a surface of the viewing-side polarizing film. Then, the non-crystallizable PET substrate was peeled from the optical film laminate, and a 52 μm-thick phase difference film (cycloolefin polymer film produced by Zeon Corporation) was laminated to prepare a non-viewing-side polarizing film.

Then, each of the phase difference film of the viewing-side polarizing film and the phase difference film of the non-viewing-side polarizing film was fabricated into an A-4 size and laminated to a respective one of viewing-side and non-viewing-side surfaces of a display panel of a liquid crystal display device through an acrylic-based adhesive (20 μm). The liquid crystal display device was turned on and set to a black display state, in a dark room. In this state, the number of bright points each having a length of at least 150 μm per side in a viewing area was counted.

(Evaluation Result)

The number of observed bright points was eleven.

Comparative Example 3

The optically functional film laminate 50 having the configuration in FIG. 10 was used. In particular, Comparative Example 3 relates to an appearance evaluation under a condition that, as for the polarizing film 3 disposed on the viewing side, a surface (3a) as a contact surface with the substrate during the production thereof is dispose to be oriented toward the display panel 202 (toward the non-viewing side), whereas, as for the polarizing film 3' disposed on the non-viewing side, a surface (3a) as a contact surface with the substrate during the production thereof is dispose to be oriented toward a side opposite to the display panel 202 (toward the non-viewing side).

A polarizing film and a defect were prepared and formed in the same manner as that in Inventive Example 1.

(Evaluation Method)

An optical film laminate was prepared by laminating, through a bonding agent, a protective layer (triacetylcellulose-based) film (thickness: 80 μm) to a surface of the viewing-side polarizing film. Then, the non-crystallizable PET substrate was peeled from the optical film laminate, and an acrylic-based adhesive (20 μm) was laminated to prepare a viewing-side polarizing film.

Further, another optical film laminate was prepared by laminating an acrylic-based adhesive (20 μm) to a surface of the non-viewing-side polarizing film. Then, the non-crystallizable PET substrate was peeled from the optical film laminate, and a protective layer (triacetylcellulose-based) film (thickness: 80 μm) was laminated through a bonding agent to prepare a non-viewing-side polarizing film.

Then, each of the viewing-side and non-viewing-side polarizing films was fabricated into an A-4 size and laminated to a respective one of viewing-side and non-viewing-side surfaces of a display panel of a liquid crystal display device through the acrylic-based adhesive (20 μm) thereof. The liquid crystal display device was turned on and set to a black display state, in a dark room. In this state, the number of bright points each having a length of at least 150 μm per side in a viewing area was counted.

(Evaluation Result)

The number of observed bright points was eleven.

Comparative Example 4

The optically functional film laminate 60 having the configuration in FIG. 11 was used. In particular, Comparative Example 4 relates to an appearance evaluation under a condition that a surface (3a) of the polarizing film 3 as a contact surface with the substrate during the production thereof is dispose to be oriented toward the display panel 602 (toward the non-viewing side).

A polarizing film and a defect were prepared and formed in the same manner as that in Inventive Example 1.

(Evaluation Method)

An optical film laminate was prepared by laminating, through a bonding agent, a protective layer (triacetylcellulose-based) film (thickness: 45 μm) to a surface of the polarizing film. Then, the non-crystallizable PET substrate was peeled from the optical film laminate, and a ¼ wavelength phase difference film (product name "Pureace WR (S-128)" produced by Teijin Chemicals Ltd.) was laminated to a surface of the PVA layer to prepare a circularly-polarizing film. Specifically, the circularly-polarizing film was prepared by arranging a surface of the polarizing film and the ¼ wavelength phase difference film of the functional optical film laminate in such a manner that a slow axis of the ¼ wavelength phase difference film forms an angle of 45 degrees with respect to an absorption axis of the polarizing film.

Then, the ¼ wavelength phase difference film of the circularly-polarizing film was fabricated into an A-4 size and laminated to a display panel of an organic EL display device through an acrylic-based adhesive (20 μm). The organic EL display device was turned on and set to a black display state, in a dark room. In this state, the number of bright points each having a length of at least 150 μm per side in a viewing area was counted.

(Evaluation Result)

The number of observed bright points was six.

Comparative Example 5

The optically functional film laminate 50 having the configuration in FIG. 10 was used. In particular, Comparative Example 5 relates to an appearance evaluation under a condition that, as for the polarizing film 3 disposed on the viewing side, a surface (3a) as a contact surface with the substrate during the production thereof is dispose to be oriented toward the display panel 202 (toward the non-viewing side), and, as for the polarizing film 3' disposed on the non-viewing side, a surface (3a) as a contact surface with the substrate during the production thereof is dispose to be oriented toward a side opposite to the display panel 202 (toward the non-viewing side).

A defect was formed in the same manner as that in Inventive Example 1, and a polarizing film was prepared in the same manner as that in Inventive Example 4.

(Evaluation Method)

An optical film laminate was prepared by laminating, through a bonding agent, a protective layer (triacetylcellulose-based) film (thickness: 80 μm) to a surface of the viewing-side polarizing film. Then, the non-crystallizable PET substrate was peeled from the optical film laminate, and an acrylic-based adhesive (20 μm) was laminated to a surface of the PVA layer to prepare a viewing-side polarizing film.

Further, another optical film laminate was prepared by laminating an acrylic-based adhesive (20 μm) to a surface of the non-viewing-side polarizing film. Then, the non-crystallizable PET substrate was peeled from the optical film laminate, and a protective layer (triacetylcellulose-based) film (thickness: 80 μm) was laminated to a surface of the PVA layer through a bonding agent to prepare a non-viewing-side polarizing film.

Then, each of the viewing-side and non-viewing-side polarizing films was fabricated into an A-4 size and laminated to a respective one of viewing-side and non-viewing-side surfaces of a display panel of a liquid crystal display device through the acrylic-based adhesive (20 μm) thereof. The liquid crystal display device was turned on and set to a black display state, in a dark room. In this state, the number of bright points each having a length of at least 150 μm per side in a viewing area was counted.

(Evaluation Result)

The number of observed bright points was twelve.

Table 1 illustrates the evaluation results of transparent conductive films of the above Inventive and Comparative Examples.

TABLE 1

| | | | Orientation of surface as contact surface with resin substrate | | |
|---|---|---|---|---|---|
| | Production method for polarizing film | Display device | Polarizing film on viewing side with respect to display panel | Polarizing film on non-viewing side with respect to display panel | Number of bright points |
| Inventive Example 1 | 2-stage stretching | LCD (VA) | Oriented toward side opposite to display panel | Oriented toward side opposite to display panel | 1 |
| Inventive Example 2 | 2-stage stretching | LCD (IPS) | Oriented toward side opposite to display panel | Oriented toward side opposite to display panel | 2 |
| Inventive Example 3 | 2-stage stretching | OLED | Oriented toward side opposite to display panel | Non | 1 |
| Inventive Example 4 | elevated temperature in-air stretching | LCD (IPS) | Oriented toward side opposite to display panel | Oriented toward side opposite to display panel | 2 |
| Inventive Example 5 | 2-stage stretching | LCD (VA) | Oriented toward side opposite side to display panel | Oriented toward display panel | 4 |
| Comparative Example 1 | 2-stage stretching | LCD (VA) | Oriented toward display panel | Oriented toward side opposite to display panel | 8 |
| Comparative Example 2 | 2-stage stretching | LCD (VA) | Oriented toward display panel | Oriented toward display panel | 11 |
| Comparative Example 3 | 2-stage stretching | LCD (IPS) | Oriented toward display panel | Oriented toward side opposite to display panel | 11 |
| Comparative Example 4 | 2-stage stretching | OLED | Oriented toward display panel | Non | 6 |
| Comparative Example 5 | elevated temperature in-air stretching | LCD (IPS) | Oriented toward display panel | Oriented toward side opposite to display panel | 12 |

In the configurations of Inventive Examples 1 to 5, as compared to the configurations of Comparative Examples 1 to 4, it becomes possible to reduce the number of bright points to be observed, i.e., lower a possibility that a defect is observed. A common feature of the Inventive Examples 1 to 5 as a difference in the comparison with the configurations of Comparative Examples 1 to 4 is that, as for a polarizing film disposed on the viewing side with respect to a display panel of an optical display device and adapted to be capable of forming the cross-Nichol relationship with regard to polarized light entering the polarizing film from the non-viewing side, a surface as a contact surface with a PET substrate during production thereof is oriented toward a side opposite to the display panel (toward the viewing side). Thus, this orientational relationship is desirable for at least the viewing-side polarizing film. Further, as is evidenced from the comparison between Inventive Example 1 and Inventive Example 5, or between Comparative Example 1 and Comparative Example 2, in the optical display device provided with two polarizing films, as for one of the polarizing films disposed on the non-viewing side, it is advantageous that a surface as a contact surface with the PET substrate during production thereof is disposed to be oriented toward a side opposite to the display panel (non-viewing side). Furthermore, the comparison between Inventive Example 2 and Inventive Example 4, or between Comparative Example 3 and Comparative Example 5 shows that the above effect has no relationship to a production method for the polarizing plate.

INDUSTRIAL APPLICABILITY

The present invention can be applied to various optical display device having a polarizing film disposed in a cross-Nicol relationship.

EXPLANATION OF CODES

1: resin substrate
3: polarizing film
4: optically functional film
14: polarizing plate
20: liquid crystal display device
30: organic EL display device
40: optically functional film laminate
50: optically functional film laminate
60: optically functional film laminate

What is claimed is:

1. An optical display device, comprising
a display panel; and
at least one polarizing film having opposed first and second sides and including a polyvinyl alcohol-based resin layer disposed on a viewing side with respect to the display panel, and having an optical arrangement forming a crossed-Nicols relationship with regard to polarized light entering the at least one polarizing film from the viewing side of the display panel,
wherein
the at least one polarizing film is produced to have a thickness of 10 µm or less, by a method comprising the steps of:
forming a polyvinyl alcohol-based resin layer on a resin substrate;
stretching the polyvinyl alcohol-based resin layer integrally with the resin substrate; and
dyeing the polyvinyl alcohol-based resin layer using a dichroic material,
the at least one polarizing film is disposed in the optical display device in a state in which a surface in which the second side of the at least one polarizing film has a contact surface with the resin substrate during the production thereof which is oriented toward a side opposite to the display panel, and
the at least one polarizing film has a defect on the contact surface of the second side formed during the above steps by a defect in or on the resin substrate from which light is emitted for polarized light entering the optical arrangement, and the emitted light is weaker than light that would be emitted from an identical defect formed on a surface of the first side.

2. The optical display device as defined in claim 1, which is a liquid crystal display device or an organic EL display device.

3. The optical display device as defined in claim 2, which is a liquid crystal display device comprising the at least one polarizing film and a second polarizing film each produced to have a thickness of 10 µm or less, by a method comprising the steps of:
forming a polyvinyl alcohol-based resin layer on a resin substrate;
stretching the polyvinyl alcohol-based resin layer integrally with the resin substrate; and
dyeing the polyvinyl alcohol-based resin layer using a dichroic material,
wherein:
the second polarizing film is disposed on a non-viewing side with respect to the display panel, and
the first polarizing film forms the crossed-Nicols relationship with regard to polarized light entering the first polarizing film from the viewing side of the display panel after penetrating through the second polarizing film.

4. The optical display device as defined in claim 3, wherein the second polarizing film is disposed in a state in which a surface of the second polarizing film has a contact surface with the resin substrate during the production thereof which is oriented toward a side opposite to the display panel.

5. The optical display device as defined in claim 3, wherein each of the first and second polarizing films comprises a protective layer provided at least on the side opposite to the display panel.

6. The optical display device as defined in claim 5, which is a VA-mode liquid crystal display device or an IPS-mode liquid crystal display device.

7. The optical display device as defined in claim 6, which is a VA-mode liquid crystal display device having a VA-mode liquid crystal cell as the display panel, wherein the VA-mode liquid crystal display device further comprises a phase difference film provided between the display panel and the first polarizing film.

8. The optical display device as defined in claim 6, which is an IPS-mode liquid crystal display device having an IPS-mode liquid crystal cell as the display panel.

9. The optical display device as defined in claim 2, which is an organic EL display device comprising the display panel, a ¼ wavelength phase difference film, the at least one polarizing film and a protective film which are arranged in this order, the optical arrangement has the crossed-Nicols relationship with regard to polarized light which, after penetrating through the at least one polarizing film from the viewing side and then undergoing a reflection at the display panel, re-enters the at least one polarizing film from the viewing side of the display panel.

10. The optical display device as defined in claim 1, wherein the at least one polarizing film is produced by:
   subjecting both a non-crystallizable ester-based thermoplastic resin substrate and a PVA-based resin layer, applied and formed on the non-crystallizable ester-based thermoplastic resin substrate, to a 2-stage stretching process consisting of preliminary in-air stretching and in-boric-acid-solution stretching; and
   subjecting the PVA-based resin layer to a dyeing treatment using a dichroic material.

11. The optical display device as defined in claim 1, wherein
   the display panel includes a liquid crystal cell, and
   a first polarizing film of the at least one polarizing film is between the liquid crystal cell and the resin substrate.

12. The optical display device as defined in claim 1, wherein
   the display panel includes an organic El cell, and
   a first polarizing film of the at least one polarizing film is between the organic EL cell and the resin substrate.

* * * * *